US008072349B2

(12) United States Patent
Janke

(10) Patent No.: US 8,072,349 B2
(45) Date of Patent: Dec. 6, 2011

(54) METHOD AND SYSTEM FOR VEHICULAR COMMUNICATIONS AND INFORMATION REPORTING

(75) Inventor: Garth Janke, Salem, OR (US)

(73) Assignee: Strategic Design Federation W, Inc. (VG)

( * ) Notice: Subject to any disclaimer, the term of this patent is extended or adjusted under 35 U.S.C. 154(b) by 0 days.

(21) Appl. No.: 13/052,658

(22) Filed: Mar. 21, 2011

(65) Prior Publication Data

US 2011/0173279 A1 Jul. 14, 2011

Related U.S. Application Data

(63) Continuation of application No. 12/787,582, filed on May 26, 2010, now Pat. No. 7,911,360, which is a continuation of application No. 12/221,953, filed on Aug. 8, 2008, now Pat. No. 7,760,110, which is a continuation of application No. 11/906,431, filed on Oct. 1, 2007, now Pat. No. 7,417,559, which is a continuation of application No. 10/970,403, filed on Oct. 20, 2004, now Pat. No. 7,277,028.

(60) Provisional application No. 60/512,934, filed on Oct. 21, 2003.

(51) Int. Cl.
*G08G 1/09* (2006.01)
*G05D 1/00* (2006.01)
*G06F 19/00* (2011.01)

(52) U.S. Cl. ... 340/902; 340/905; 340/993; 340/995.13; 701/1; 701/117

(58) Field of Classification Search .................. 340/902, 340/905, 904, 988, 993, 995.1, 995.13; 701/1, 701/117, 118, 119, 211
See application file for complete search history.

(56) References Cited

U.S. PATENT DOCUMENTS

| | | | | |
|---|---|---|---|---|
| 5,699,056 | A | 12/1997 | Yoshida | |
| 6,167,333 | A | 12/2000 | Gehlot | |
| 6,253,146 | B1 | 6/2001 | Hanson et al. | |
| 6,304,816 | B1 | 10/2001 | Berstis | |
| 6,537,743 | B2 * | 3/2003 | Motokui et al. | 430/619 |
| 6,583,734 | B2 | 6/2003 | Bates et al. | |
| 6,813,247 | B1 | 11/2004 | Hassan | |
| 6,973,384 | B2 * | 12/2005 | Zhao et al. | 701/117 |
| 7,047,130 | B2 | 5/2006 | Watanabe et al. | |
| 2004/0116106 | A1 | 6/2004 | Shishido et al. | |
| 2007/0100513 | A1 * | 5/2007 | Asano | 701/2 |

OTHER PUBLICATIONS

"A web address for every car?", p. 14, The Economist Technology Quarterly, Sep. 6, 2003.

* cited by examiner

*Primary Examiner* — Toan N Pham
(74) *Attorney, Agent, or Firm* — Carlineo, Spicer & Kee, LLC

(57) ABSTRACT

A method for vehicular communications and information reporting. First and second wireless Internet connections between respective first and second vehicles and a web-server are provided. First and second event information is transmitted, to the web-server, from the first and second vehicles. The first and second event information relates to the same event in visual range, respectively, of occupants of the first and second vehicles. The web server may transmit, to the first and second vehicles, confirmed event information derived from the first and second event information.

20 Claims, 4 Drawing Sheets

METHOD AND SYSTEM FOR VEHICULAR COMMUNICATIONS AND INFORMATION REPORTING

RELATED APPLICATIONS

This application is a continuation of U.S. patent application Ser. No. 12/787,582, filed May 26, 2010 now U.S. Pat. No, 7,911,360, entitled Method and System for Vehicular Communications and Information Reporting, which is a continuation of U.S. patent application Ser. No. 12/221,953, filed Aug. 8, 2008, entitled Method and System for Vehicular Communications and Information Reporting (now U.S. Pat. No. 7,760,110), which is a continuation of U.S. patent application Ser. No. 11/906,431, filed Oct. 1, 2007, entitled Method and System for Vehicular Communications and Information Reporting (now U.S. Pat. No. 7,417,559), which is a continuation of U.S. patent application Ser. No. 10/970, 403, filed Oct. 20, 2004, entitled Method and System for Inter-vehicular Communications and Information Reporting (now U.S. Pat. No. 7,277,028), which claims the benefit of U.S. Provisional Patent Application No. 60/512,934, filed Oct. 21, 2003, entitled Method and System for Vehicular Communications.

The entire disclosures of all of the foregoing applications are incorporated herein by reference.

FIELD OF INVENTION

The present invention relates to a method and system for inter-vehicular communications and information reporting.

BACKGROUND

As people become more reliant on the Internet, the need arises to access the Internet from within a moving vehicle, such as a car or truck. This capability is currently provided by laptop computers having wireless Internet connectivity, hand-held devices such as PDAs, and an increasing number of cell phones, and should soon be widely provided in vehicles as standard, built-in equipment. For example, General Motors currently provides a limited Internet based communications system built-in to its more upscale vehicles which is marketed as "OnStar."

While the Internet can connect a vehicular traveler to a practically unlimited number of land-based computers, the computers have not been adapted to serve the special needs of the vehicular traveler. For example, there is often a desire, when traveling, to communicate with the unknown occupant of another vehicle that is in sight of the traveler. There is also often a desire, when traveling, to obtain specific local information that is useful to a traveler, such as local road status information, where the local information is provided or reported by travelers in other vehicles who are privy to the information. More generally, there is a need for a method and system for inter-vehicular communications and information reporting to serve the vehicular traveler.

SUMMARY

Methods and systems for vehicular communications and information reporting according to the present invention are disclosed. A method for information reporting and dissemination for use in vehicles provides first and second wireless Internet connections between respective first and second vehicles and a web-server. First and second event information is transmitted, to the web-server, from the first and second vehicles, over the respective first and second wireless connections. The first and second event information relates to respective first and second events within visual range, respectively, of occupants of the first and second vehicles. The web server may transmit, to the first and second vehicles, over the respective first and second wireless connections, confirmed event information derived from the first and second event information.

DETAILED DESCRIPTION

Figure 1:
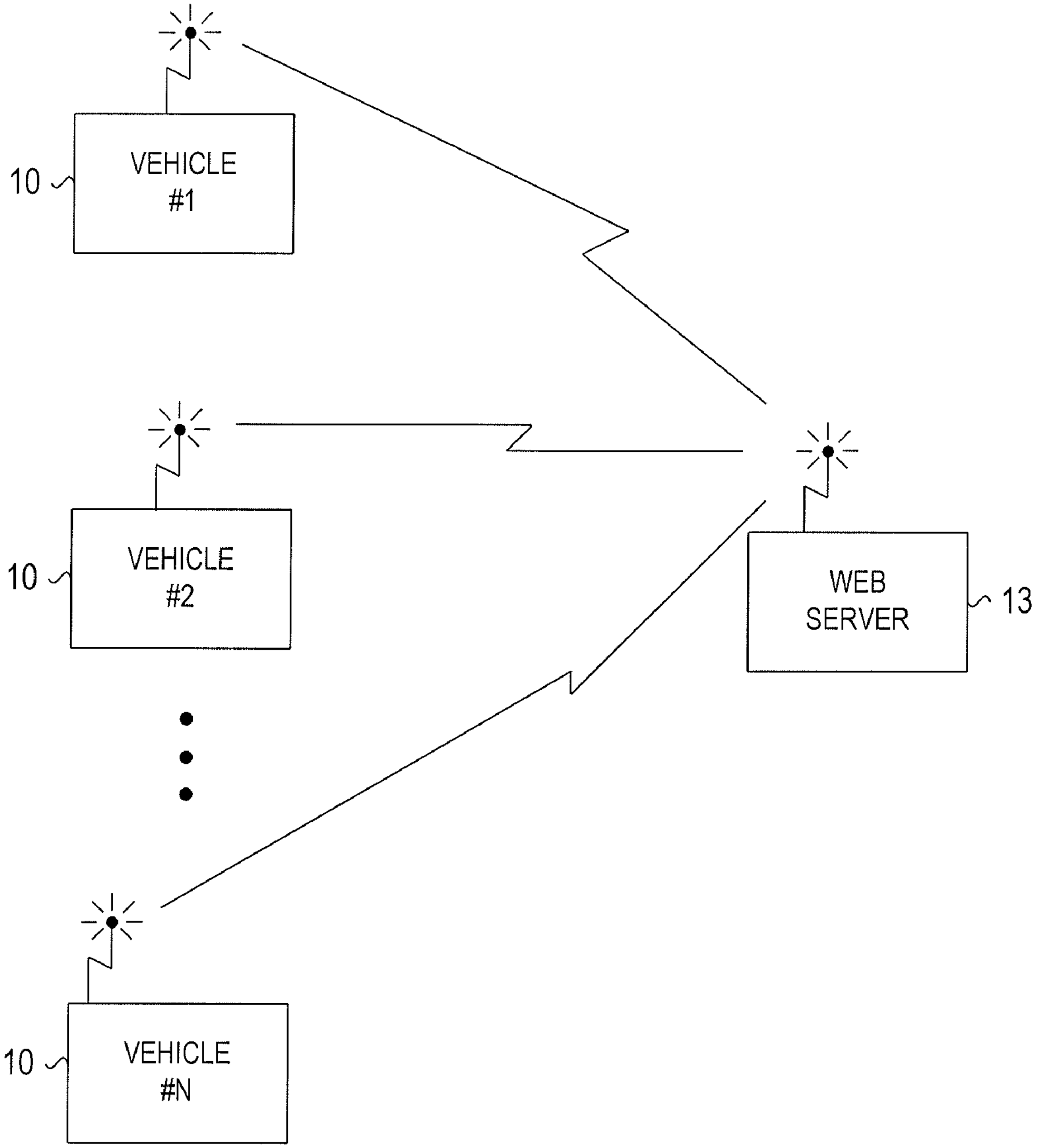
FIG. 1 is a block diagram of a preferred system for vehicular communications and information reporting according to the present invention.

FIG. 1 is a block diagram of a system 10 for vehicular communications and information reporting. A vehicle for purposes herein may be any transportation device, but the invention is believed to be particularly advantageous for and is particularly suited to use in communications between cars and trucks traveling on roads or stopped at roadsides.

An instance of the system 10 is provided for a number of vehicles, each making a wireless network connection 12 over a cellular network (not shown) with a network server 13 or other network accessible computer. The network connection 12 may make use of any wireless network protocol, e.g., WiFi or Bluetooth. The term "network server" is used generally herein as being a hub device connected to any network, which is preferably the Internet but which may be any network including a private access network such as a LAN or WAN.

Figure 2:
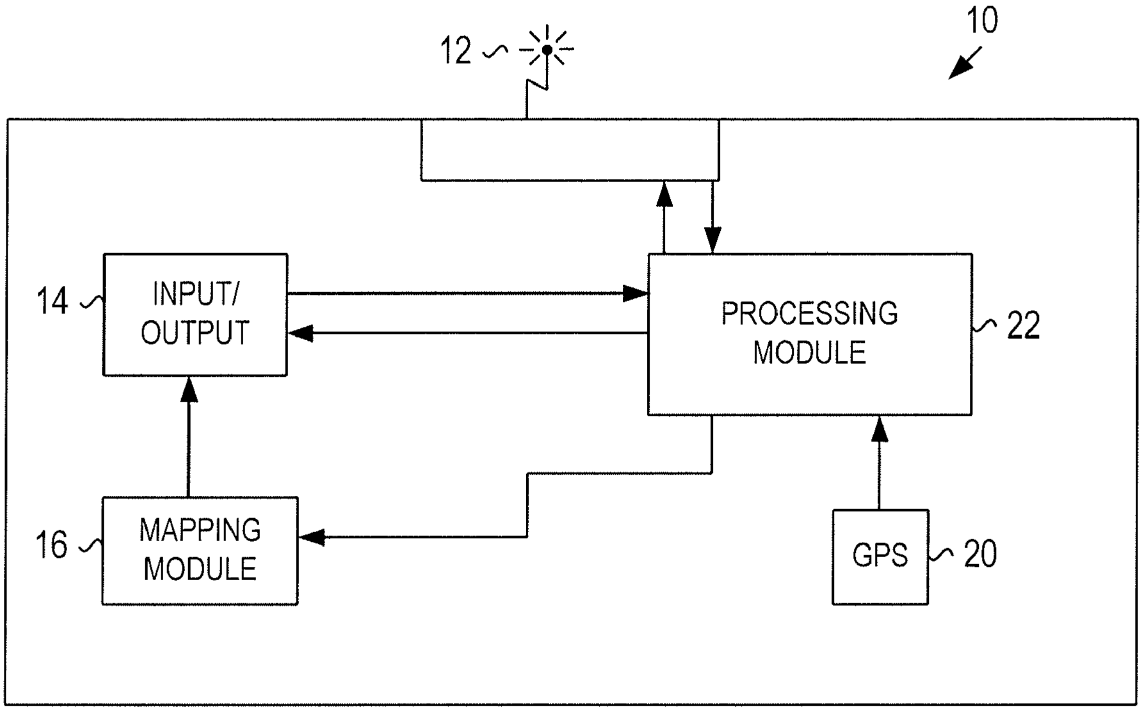
FIG. 2 is a block diagram of selected internal features of the system of FIG. 1.

According to a first, event reporting aspect of the present invention, the system 10 provides for entering local road status information from a vehicle and reporting local road status to the vehicle. To serve this purpose, turning to FIG. 2, each system 10 includes an input/output device 14 for use in the vehicle, a mapping module 16, a global positioning system module 20, and a processing module 22.

The network server 13 generally provides, among other things, the service of receiving information entered by vehicular occupants or owners who subscribe to the service ("subscribers"), though subscribing to the service is not essential to the invention. In the preferred event reporting embodiment of the invention, the event is a road condition, some examples of which are restaurants, vehicular incidents or accidents, objects in the road, and the disposition of official vehicles. The input/output device 14 is therefore adapted for entry of these and other road related events.

There are many types of input/output devices available, and other types of such devices will likely become available in the future. The devices may be built into the vehicle, or may be personal portable devices such as laptop computers having wireless Network connectivity, hand-held devices such as PDAs, and cell phones. There is no intention herein to limit practice of the invention to any particular type of input/output device.

For graphics-based input/output devices, representative icons may be provided for displaying different types of information for selection, which may be selected via a touch-screen. For voice-based input/output devices, the device is adapted to recognize speech representative or indicative of the different types of information. For text-based input/output devices, a visual display device is accompanied by a keypad which provides a suitably limited number of text choices for data input appropriate to data entry in a moving vehicle.

The input/output device 14 is preferably adapted so that event "type" information may be accompanied by corresponding severity or "importance" information, such as a ranking, e.g., 1-5. For example, a road hazard may be graded 3 out of 5, indicating a significant traffic delay, or a restaurant may be graded as being "five star." While importance information that is simply a number indicative of a rank is preferred because it is easy to enter and view, importance information can be any characterization of the event including any textual or graphical characterization without departing from the principles of the invention.

A vehicular occupant would observe an event about which he or she desires to communicate to others, typically while traveling. The occupant characterizes or describes the event with type and importance information, and enters the characterization by use of the device 14 into a database maintained by the network server 13.

Along with the type and importance information, the processing module 22 preferably appends time information as well as location information obtained from the global positioning system module 20 identifying the time and location of the event. The global positioning system module provides the position of the vehicle at a first time corresponding to the time of entry of the event, however, position information could be entered manually. The system 10 may assume that the position of an event is not substantially different from the position of the vehicle at the time of entry of the event. Alternatively, a predetermined or user specified lag time may be assumed. As will be readily apparent, the approximate location of the event can be computed using this lag time in conjunction with obtaining the position of the vehicle at a second time, where the direction and speed of travel of the vehicle can be computed using the change in the two known positions between the two known times.

The event information is preferably accompanied by an identifier for identifying the vehicle or a vehicular occupant, or both, from which the information was provided ("identity identifier").

The event information, along with the identity identifier, is transmitted to the network server 13 over the network via the wireless connection 12. The network server is adapted to receive the event information input from one vehicle and determine whether to report the information to other vehicles. Such determination can resolve into a number of different actions as discussed more fully below, such as to pass the information through unchanged, to modify the information, or to suppress the information.

The vehicle, or the system 10 if it is portable, has an IP, email or other form of address (hereinafter "Address"), and the network server 13 possesses the Address as well as information identifying the subscriber, so that the network server, using the identity identifier, may identify and evaluate the source of event information received from the vehicle, such as described further below.

The network server includes a database for storing the event information along with the aforementioned identity identifier. Using this database, the network server may provide to the system 10 in a selected vehicle reports regarding events within a predetermined user or programmatically specified range of the vehicle's location. The vehicle's location may be known to the network server by providing it to the network server by use of the vehicle's global positioning system. Updated vehicle location information for each vehicle may be transmitted to the network server, preferably repeatedly at predetermined intervals and automatically. As an alternative, reports can be broadcast to all subscribers using a subscriber list without regard to vehicle location. In that case, the processing module 22 in each vehicle may sort or edit the information as desired for relevance or convenience to the user.

Figure 3:
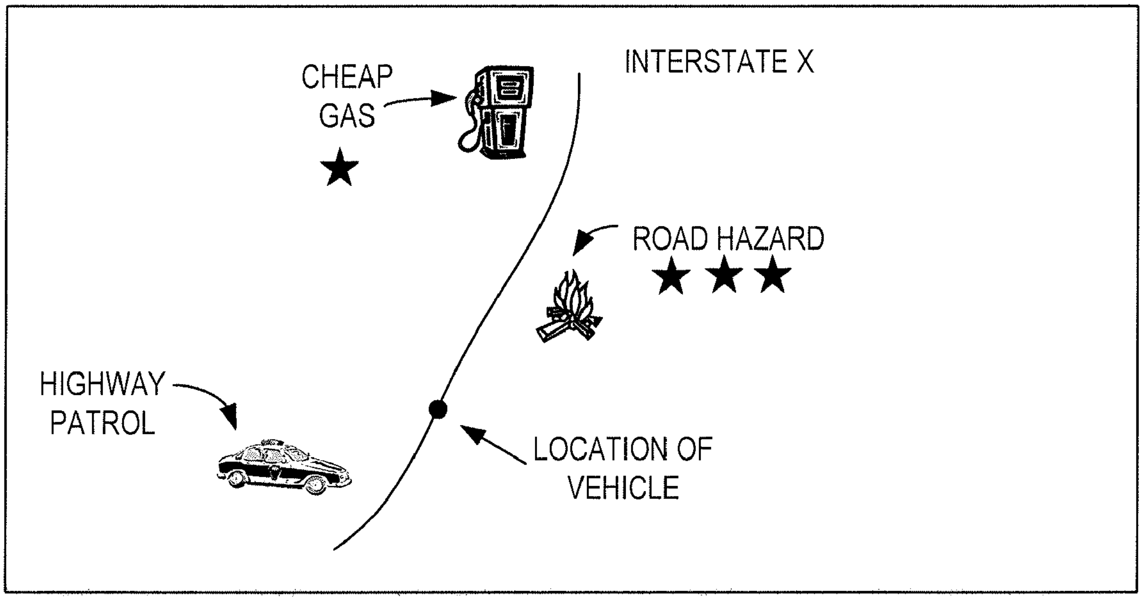
FIG. 3 is an exemplary output display of a map providing event information according to the present invention.

The transmitted reports are output to the users through the respective input/output devices 14. More particularly, with reference to FIG. 3, event information is preferably displayed on a graphics output display 19*a* of a graphics-based input/output device 14, the map being provided and maintained by the mapping module 16. As indicated by the configuration shown in FIG. 2, the processor 22 may update the map with event information and instruct the mapping module to provide an updated map to the input/output device 14. Alternatively, the processing module may consult the mapping module, modify the map and provide the map to the input/output device.

The map may center on the vehicle's current location and scroll as the vehicle travels to maintain this centering as is known in the art. Alternatively, the map may be stationary with respect to the display and the vehicle's location movably plotted on the map with updates to the map being brought into view as boundaries are crossed. Some or any selected part of the event information is graphically or iconically represented on the map. For example, the existence of a restaurant may be indicated by a graphical representation of a restaurant at the appropriate location on the map, and importance information indicating that one or more subscribers consider the restaurant to be exceptional may be displayed by the use of one or more star-shaped icons; the prices charged by a gas station or the severity of a road hazard may be graphically or textually indicated along with an iconic representation on the map, and the location or disposition of a parked patrol or service vehicle may be indicated by a suitably shaped icon. These are just some examples; it will be readily appreciated that graphic presentation of information may be provided in numerous ways.

Where the input/output device 14 is suitable only for text or voice-based output, or where textual or audio output is otherwise desired, the network server may provide textual or voice descriptions of the events, and the locations of the events may be provided during the time that the vehicle is in a predetermined or user-specified proximity to the event. The network server may be in repeated communication with the global positioning system module of the vehicle, such as mentioned above, to track the movement of the vehicle for this purpose.

Figure 4:
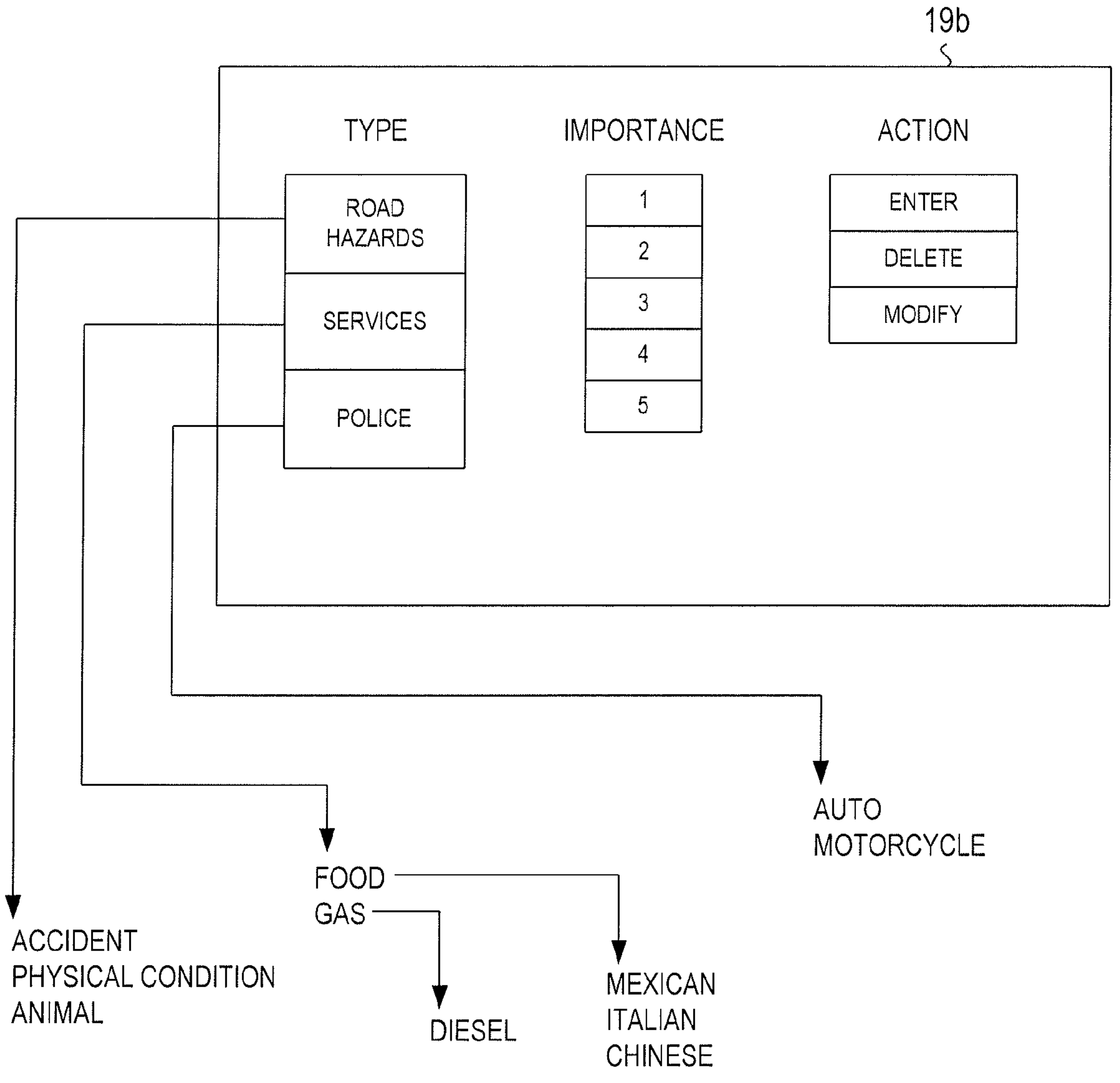
FIG. 4 is an exemplary input display according to the present invention for entering event information.

With reference to FIG. 4, a preferred touch-screen input display 19*b* provides a menu of choices for input of event information. While the text descriptors are shown, graphical descriptors may also be used. Some examples of initial input choices and subsequent choices linked to the initial choices are provided to illustrate the method. Where the input/output device 14 is suitable only for voice-based input and in the absence of greater intelligence, the system 10 may be programmed to recognize certain words or phrases.

It is a problem that event information that is once entered into the system may not remain current. For example, a road hazard that is indicated as being present at a certain position may in fact have been removed some time previously. According to the invention, a vehicular occupant may inform the network server of any discrepancies between what is actually present and what the map indicates as being present. The user may indicate event discrepancies by re-entering the event correctly, or pointing to the event on the map along with entering a code instructing the network server to delete or modify the description of the event.

It is also a problem that information entered by vehicular occupants may not be reliable. In the worst case, event information may be deliberately entered incorrectly. In addition, event information provided from different vehicles may be inconsistent or contradictory, as indicated immediately above.

According to the invention, different data corresponding to the same location (or same event) may be analyzed to determine a most likely description of the event for reporting to subscribers. Event information may be confirmed or modified ("confirmed event information") as a result of the analysis. Any number of different known statistical techniques may be used. A simple and illustrative means for analysis is simply to average the event information, or portions thereof, provided by multiple providers. For example, in the case where an event either is or is not present, the network server may presume that the event is not present, and therefore decline to report the event, if less than a predetermined threshold, e.g., 80%, of the information received about the event indicates that the event is present. Importance rankings and locations may simply be numerically averaged to obtain a most reliable or likely value. Where traffic flows in both directions, a large number of entries for the location of an event may converge to the actual location whether the entries are corrected for lag or not. Similar in concept to averaging, a voting or multi-voting scheme may be used.

Especially for the purpose of updating event information, event information may be weighted for statistical analysis generally, or averaging specifically, according to its recency. Especially for the purpose of ensuring the reliability of event information, event information may be weighted for this averaging based on a history of reliability for event information associated with a particular identity identifier. Weighting can be done in combination to serve both purposes.

In accord with the reliability considerations above, the network server may not report an event or an aspect of the event (i.e., provide confirmed event information) unless and until a predetermined number of votes or entries are obtained for the event or aspect. The number of votes may be normalized for particular areas in which traffic density is known to be high or low, and for particular times at which traffic density is known to be high or low. An event may also not be reported the network server fails to receive a sufficient number of entries that agree with one another, or agree with one another in certain critical or important respects, or if the event is reported by a source that is known or estimated to be unreliable based on prior information received from the source.

As should be apparent, there is a wide variety of methods that may be used for deciding when and how to report event information to subscribers, and the format for displaying the event information. While some illustrative examples have been provided above, it should be understood that many alternative methods may be used without departing from the principles of the invention.

Turning now to a second, messaging aspect of the invention, the system 10 includes an input/output device 14 but need not include the other components mentioned above since all of the intelligence of the overall system may reside in the network server 13. Again, the network server 13 generally provides, among other things, the service of receiving information about an event entered by vehicular occupants or owners who subscribe to the service ("subscribers"), though subscribing to the service is not essential to the invention. More particularly, a messaging embodiment of the invention as described herein provides for safe message exchange between persons who can see one another from within their vehicles but do not know each other. The network server is adapted to receive message information input from one vehicle and addressed to another vehicle and determine whether to transmit the information to the other vehicle. Such determination can resolve into a number of different actions as discussed more fully below, such as to transmit the message, save the message for later consideration, or to suppress the message.

According to a preferred messaging embodiment of the invention, along with the Address for the vehicle, the network server is provided the vehicle license number or numbers of its subscribers. Then, a subscriber in vehicle A spots an occupant in vehicle B to whom the subscriber in vehicle A wishes to send a message. An illustrative and preferred protocol to enable this and subsequent communications according to the invention is next described below. However, it should be understood that many variations of the exemplary protocol may be employed without departing from the principles of the invention.

The subscriber in vehicle A notes indicia unique to the vehicle B, preferably the license number (which may be numeric, alpha, or alphanumeric) of vehicle B, and enters that license number into the input/output device 14 of the system 10 for the vehicle A, for transmission to the network server 13. The network server checks its database for a record of the license number of the vehicle B. If the license number is not present on the database, or if the license number is present on the database, the network server returns an appropriate message to the system 10 for the vehicle A.

As will be readily appreciated, indicia provided on bumper or window stickers or the like for identifying the vehicle to the network server may be used as an alternative to indicia provided by the vehicle's license plate number, registration number, or other unique marking already provided on the vehicle.

If the network server determines that the license number of the vehicle B is on the database, the network server has the Address of the system 10 for the vehicle B, and the occupant of vehicle A may send a message to the network server for delivery to the system 10 for the vehicle B.

The message may be spontaneously composed, predetermined, or be one of a number of predetermined choices made by the occupant of the sending vehicle A. The message is input from the system 10 for the vehicle A with the input/output device 14 for that vehicle's system.

The message as delivered by the network server 13 to the system 10 for the vehicle B is output from the system 10 for the vehicle B on the input/output device 14 of that vehicle's system so that the message can be visually or audibly perceived by the occupant of vehicle B.

The occupant of vehicle B may or may not wish to respond to the message from vehicle A. If the occupant of vehicle B does not respond to the message, the network server 13 will not send any subsequent messages received from the system 10 for the vehicle A to the system 10 for the vehicle B. The network server may simply save the message as indicated below.

Alternatively, the occupant of vehicle B may not be sure at the time the message is received whether to respond to the message or not, or may be sure that he or she wants to respond to the message but not be sure when to respond to the message, or may want to respond to the message immediately. If the occupant wishes to respond to the message immediately, he or she simply sends a message to the network server for delivery to the system 10 for the vehicle A. The message may be spontaneously composed, predetermined, or be one of a number of predetermined choices.

If the occupant of the vehicle B is not sure if or when to respond to the message from the vehicle A, the occupant may indicate that the message should be saved. Alternatively, as indicated above, the network server 13 may save messages as a default if the occupant does not respond. Saved messages may be held by the network server for a predetermined or user-specified time, after which the messages are deleted if a response has not yet been received. The occupant of vehicle B may call up the saved messages and indicate, using the input/output device 14 of that vehicle's system, which of the saved messages a present message which the occupant is now ready to send is responding to.

The system 10 in conjunction with the remote network server 13 may also be adapted so that the occupant of vehicle B may instruct the network server to disable vehicle A from further communications with vehicle B. This disabling feature may be operable for a predetermined or user-specified time, or may be maintained as permanent.

Subsequent communications between vehicle A and vehicle B may be carried out precisely as described above, where the role of vehicle A is assumed by vehicle B and the role of vehicle B is assumed by vehicle A, and so on.

The system 10 in conjunction with the remote network server 13 may provide for a "do not disturb" mode of operation wherein a subscriber indicates to the network server a desire to receive no messages. The "do not disturb" instruction may be enforced for a predetermined or user-specified time, or may remain in place until the user affirmatively retracts the instruction.

The system 10 in conjunction with the remote network server 13 preferably indicates to the initiator in advance of a proposed communication whether permission to deliver a message will be granted. Permission may be denied either because the vehicular occupant to whom the message is to be addressed is not a subscriber, so that communication will not be possible, or because the vehicular occupant has activated the "do not disturb" function. If permission will not be granted, the subscriber need not make the effort required to compose or select a message.

Figure 5:
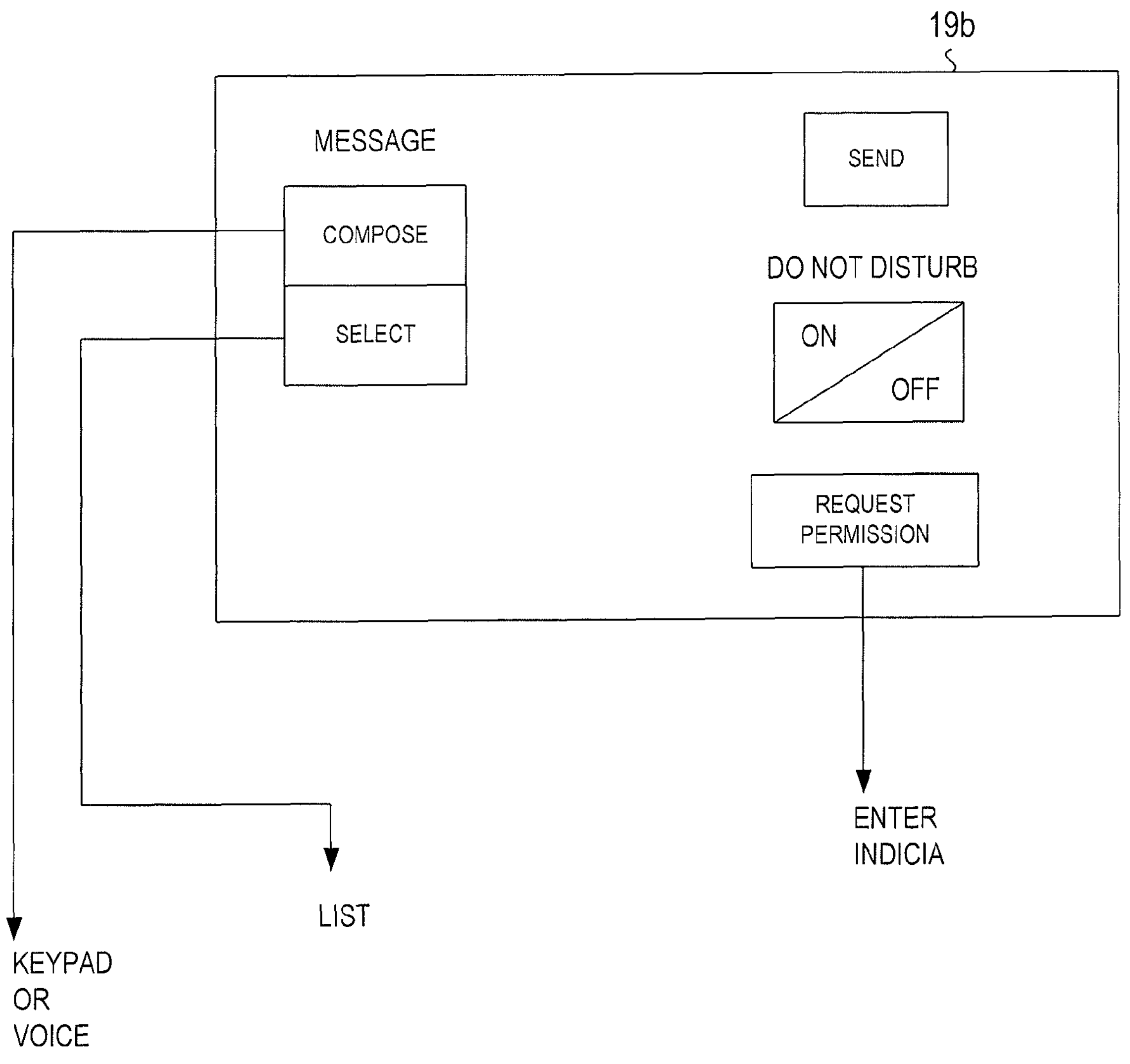
FIG. 5 is an exemplary input display according to the present invention for entering messaging information.

A message may be displayed on the graphics output display 19*a*, or may be output in audio form as speech. To enter messaging information, the input display 19*b* is used. An exemplary menu for the input display 19*b* according to the messaging aspect of the invention is shown in FIG. 5. To produce a message, the occupant may, for example, choose to compose a message from scratch using a keypad or voice input. A simple set of the most commonly used word processing functions may be provided to assist the occupant to create a message. Alternatively, the user may select a message from a list of previously composed or previously provided messages, which may be conveniently organized by type of message, such as friendly greetings (e.g., "Hello, where are you headed?") or warnings (e.g., tires low, signal out), etc. A command icon indicated as "send" is provided to send indicia identifying the vehicle to which the message is to be sent, and to send the ultimate message, to the network server 13.

The messaging aspect of the invention may be employed in non-vehicular settings. For example, a dating service could assign registered singles indicia and publish or transmit their pictures and biographies along with the indicia. People could contact one another with two levels of safety. There is the usual safety that results from registering with the dating service. There is also a level of safety in that a line of communication can be opened that can be safely and permanently closed at any time at the will of either party.

As will be readily appreciated, in a non-vehicular setting it is not necessary that connections to the network be made wirelessly. Further, where people are gathered in a localized area, a local area network may well substitute for a large scale network such as the Internet.

Preferably, indicia are selected or used that will maintain a degree of personal anonymity after communications are closed. For this reason, a user's normal or ordinary email address, for example, may not be desirable indicia, however, a temporary email address could be used that may be later abandoned if desired.

It should be understood that the network server 13 and the system 10, according to the present invention, may share or apportion functions as described above as desired. For example, all of the intelligence for the system 10 (e.g., in the processing module 22) may reside on the network server 13, in the system 10, or be distributed between the network server and the system 10. Further, the system 10 may be implemented in any combination of hardware, software, and firmware as will be readily appreciated by persons of ordinary skill.

It should be more generally understood that, while selected methods and apparatus according to the invention have been shown and described as being preferred, other methods and apparatus incorporating one or more of the features described herein may be employed without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

What is claimed:

1. A method of communicating update information for a geographic location, the method comprising:

receiving, by a network server, a plurality of event notifications associated with an event from a plurality of first devices, each of the event notifications including geographic location information and importance information relating to the respective event notifications;

identifying at least two received event notifications having a common geographic location;

determining common update information based, at least in part, on the identified at least two event notifications;

calculating an importance score for the common update information based on the importance information corresponding to the at least two received event notifications;

generating an update message comprising the common update information and the importance score; and transmitting, by the network server, the update message to one or more second devices.

2. The method of claim 1, wherein the geographic location information of each of the plurality of event notifications corresponds to the location of the respective first devices at the time the respective event notifications were composed.

3. The method of claim 2, wherein the determining common update information includes determining an estimated second geographic location for the common update information.

4. The method of claim 1, further comprising:

updating a reliability level associated with at least one of the plurality of first devices based at least in part on the determining the common update information; and weighting subsequent communications from the at least one of the plurality of first devices based on the updated reliability level when calculating the importance score.

5. The method of claim 1, wherein the importance information is a ranking of the event.

6. The method of claim 1, wherein the importance information is a textual or graphical characterization of the event.

7. A system of communicating update information for a geographic location, the system comprising:

a network server configured for:

receiving a plurality of event notifications associated with an event from a plurality of first devices, each of the event notifications including geographic location information and importance information; and transmitting an update message to one or more second devices;

a processor configured for:

identifying at least two received event notifications having a common geographic location;

determining common update information based, at least in part, on the identified at least two event notifications;

calculating an importance score for the common update information based on the importance information corresponding to the at least two received event notifications; and generating the update message, the update message comprising the common update information and the importance score.

8. The system of claim 7, wherein the geographic location information of each of the plurality of event notifications corresponds to the location of the respective first devices at the time the respective event notifications were composed.

9. The system of claim 8, wherein the processor is further configured for estimating the common geographic location by processing the geographic location information corresponding to the at least two received event notifications.

10. The system of claim 7, wherein the processor is further configured for:

updating a reliability level associated with at least one of the plurality of first devices based at least in part on the determining the common update information; and weighting subsequent communications from the at least one of the plurality of first devices based on the updated reliability level when calculating the importance score.

11. The system of claim 7, wherein the importance information is a ranking of the event.

12. The system of claim 7, wherein the importance information is a textual or graphical characterization of the event.

13. A method for communicating event updates associated with a first event, the method comprising:

receiving, by a network server, a first communication from a first device, the first communication comprising (i) first event information associated with the first event; and (ii) first importance information relating to the first event information;

receiving, by the network server, a second communication from a second device, the second communication comprising (i) second event information associated with the first event; and (ii) second importance information relating to the second event information;

determining common information for the first event from the first event information and the second event information;

generating an update message for the first event comprising the common information; and transmitting, by the network server, the update message to one or more third devices.

14. The method of claim 13, wherein the common information comprises an average of the first importance information and the second importance information.

15. The method of claim 13, wherein the importance information is a ranking of the first event.

16. The method of claim 13, wherein the importance information is a textual or graphical characterization of the first event.

17. The method of claim 13, wherein the first communication and the second communication include first and second location information associated with the first event.

18. The method of claim 17, further comprising:

receiving position information from the one or more third devices; and determining that the position information relates to the first event based on a comparison with the first and second location information.

19. The method of claim 13, wherein the first event is a road condition.

20. The method of claim 19, wherein the road condition is a restaurant.

* * * * *